United States Patent
Reed et al.

[11] 3,952,833
[45] Apr. 27, 1976

[54] METHOD AND APPARATUS FOR GENERATING PRESSURE WAVES IN WATER BY IMPLOSION

[75] Inventors: Dale H. Reed; Alpheus A. Franklin, both of Dallas, Tex.

[73] Assignee: Atlantic Richfield Company, Los Angeles, Calif.

[22] Filed: Dec. 26, 1974

[21] Appl. No.: 536,356

[52] U.S. Cl. .............................. 181/118; 181/120; 181/114; 340/17 R
[51] Int. Cl.² ..................... G01V 1/38; G01K 11/00
[58] Field of Search ............... 181/114, 118, 120; 175/296; 340/17, 8 S; 29/594; 114/235

[56] References Cited
UNITED STATES PATENTS

| | | | |
|---|---|---|---|
| 3,430,727 | 3/1969 | Strange et al. | 181/114 |
| 3,478,838 | 11/1969 | Kilmer | 181/118 |
| 3,818,440 | 6/1974 | Pransfield | 114/235 |

FOREIGN PATENTS OR APPLICATIONS

| | | | |
|---|---|---|---|
| 826,932 | 1/1960 | United Kingdom | 181/118 |

Primary Examiner—Nelson Moskowitz
Attorney, Agent, or Firm—Robert M. Betz

[57] ABSTRACT

A gas exploder consisting of a rigid cylindrical lower member and a rigid upper member telescoping therein to form a chamber in which a gas explosion can take place is supported beneath the surface of the water from a float by means of low resilience ropes connected to the bottom of the lower member so as to substantially limit its allowable downward movement. The upper member includes a piston downwardly biased within the lower member by an air spring and a hollow pedestal connected to the piston and extending freely through the float above the surface of the water to accommodate fuel, compressed air and exhaust conduits communicating with the interior of the housing. The energy of an explosion in the combustion chamber is expended primarily through rapid upward movement of the piston, which compresses the air spring and then lifts the lower member. Implosion of the resultant cavitation bubble adjacent the bottom surface of the lower member generates a pressure pulse of large peak amplitude.

18 Claims, 3 Drawing Figures

METHOD AND APPARATUS FOR GENERATING PRESSURE WAVES IN WATER BY IMPLOSION

BACKGROUND OF THE INVENTION

1. Field of the Invention

This invention relates generally to the field of geophysical prospecting and more particularly to an apparatus and method for generating acoustic pressure pulses in water by implosion which are well adapted for marine seismic prospecting.

2. Description of the Prior Art

A considerable amount of attention has already been focused in the prior art of marine seismic energy systems on the generation of so-called acoustic waves in water by implosion. Existing devices and techniques of this character create a gaseous bubble in the water by known means which then implodes or collapses due to hydrostatic forces to provide such an acoustic pulse. Generally, the bubble is created either by injecting air or other gas into the water or by rapidly separating a pair of contiguous submerged rigid body surfaces to establish a partial void in the intervening space. The latter approach has the advantage that the gaseous phase occupying the bubble prior to implosion is condensable water vapor and hence offers the least resistance to bubble collapse, thereby enhancing the peak pressure pulse amplitude obtainable and reducing the oscillatory pulses caused by expansion and contraction of the non-condensable gas. The present invention relies upon the formation of such a condensable water vapor bubble but the method and apparatus are fundamentally different.

Cavitation, or creation of a low pressure vapor phase within a body of water, is a phenomenon which accompanies the movement of rigid objects in a fluid environment. In general, its presence is considered undesirable because it produces a drop in efficiency and because the energy of a collapsing cavitation bubble tends to erode or pit the surface of the body against which it forms. In a known form of marine seismic gas exploder exemplified by U.S. Pat. No. 3,401,770 to Kilmer et al, the presence of cavitation is recognized. Here a gas explosion confined within a combustion chamber in the exploder drives a bottom mass in a downward direction to deliver a primary compressive pulse to the water. When the mass reaches the limit of its allowable travel and reverses direction due to reaction forces, cavitation occurs at its under surface. The collapse or implosion of such a cavity generates impulsive pressures perceived as a secondary pulse. Prior devices of this character have been concerned to attenuate or minimize the effect of such a secondary pulse so as to avoid interference with the interpretation of the primary pulse.

Attention is also directed for comparative purposes to U.S. Pat. No. 3,818,440 to Dransfield et al which is directed to an apparatus supporting a marine seismic gas generator of the type under consideration beneath the surface of the water. In this apparatus, the entire weight of the generator is transmitted to the float through a hollow vertical firing tube which is fixed to a recoil piston slidable within an outer cylindrical housing. A gas explosion confined within the combustion chamber formed between the lower surface of the piston and the bottom mass of the cylinder drives the latter downwardly to generate a compressive pulse of interest. Chains are attached to the housing from the float to prevent a pendulum effect in towing. However, they are not under tension so as to support the weight of the housing and they do not initially restrain, damp, or limit its downward movement. With this type of suspension for the seismic generator, experiment has shown that although a cavitation pulse occurs, its peak amplitude is not more than twice that of the primary pulse.

With these aspects of the prior art in mind, the inventors have devised a method and apparatus for supporting a marine seismic gas exploder of the type described wherein the initial compressive pulse is highly attenuated and the secondary cavitation pulse is emphasized to an extent sufficient to greatly increase the difference in their relative peak amplitudes. As a consequence, the cavitation pulse appears substantially alone in the resultant acoustic wave form.

SUMMARY OF THE INVENTION

It is, therefore, a general object of this invention to provide an improved apparatus and method for generating an acoustic pressure pulse in water by implosion of a vapor bubble.

It is a further object of this invention to provide an improved method and apparatus for generating a high energy pressure pulse in water.

It is another object of this invention to provide an improvement in apparatus for generating an implodable vapor bubble in water by emphasizing the cavitation phenomenon.

These and other objects, features, and advantages of this invention will become apparent to those skilled in the art from a consideration of the following detailed description and drawings of a preferred embodiment of the invention when taken in conjunction with the appended claims.

In accordance with a preferred embodiment of this invention, the apparatus includes a closed upstanding cylindrical housing dependently supported beneath the surface of the water from a floating platform. A piston is slidably mounted within the housing without external support and is adapted to form with the bottom and the sidewalls of the housing an expansible combustion chamber. The bottom of the housing is interconnected with the float by means of low resilience ropes which elastically restrain its downward movement while providing shock isolation for the platform. Means are provided for confining an explosion within the chamber which lifts the piston to compress an air spring within the housing and thereby to transmit a lifting force to the housing so that an imploding cavitation vapor bubble is created adjacent its under surface. A hollow pedestal connected to the piston extends through the float above the surface of the water and carries conduits for introducing air and fuel into the housing and for scavenging the exhaust gases, the conduits being mounted so that the force of the explosion subjects them to tension rather than compression.

The invention also comprehends broadly a method of creating an acoustic pressure pulse in water by implosion of a condensable vapor bubble, comprising generally the steps of supporting a closed cylindrical housing in an upstanding position beneath the surface of the water, biasing a piston downwardly therein by air spring means, elastically restraining the downward movement of said housing while permitting relatively free upward movement thereof and initiating a gas explosion within the housing adapted to accelerate the piston toward the top of the housing. On approaching the limit of its travel therein and compressing the air spring, the piston transmits a relatively sudden lifting force to the housing which is accentuated by the subsequent expansion of the air spring so as to produce a net upward displacement of the water, thereby generating an implodable vapor bubble.

DETAILED DESCRIPTION OF THE PREFERRED EMBODIMENTS

Figure 1:
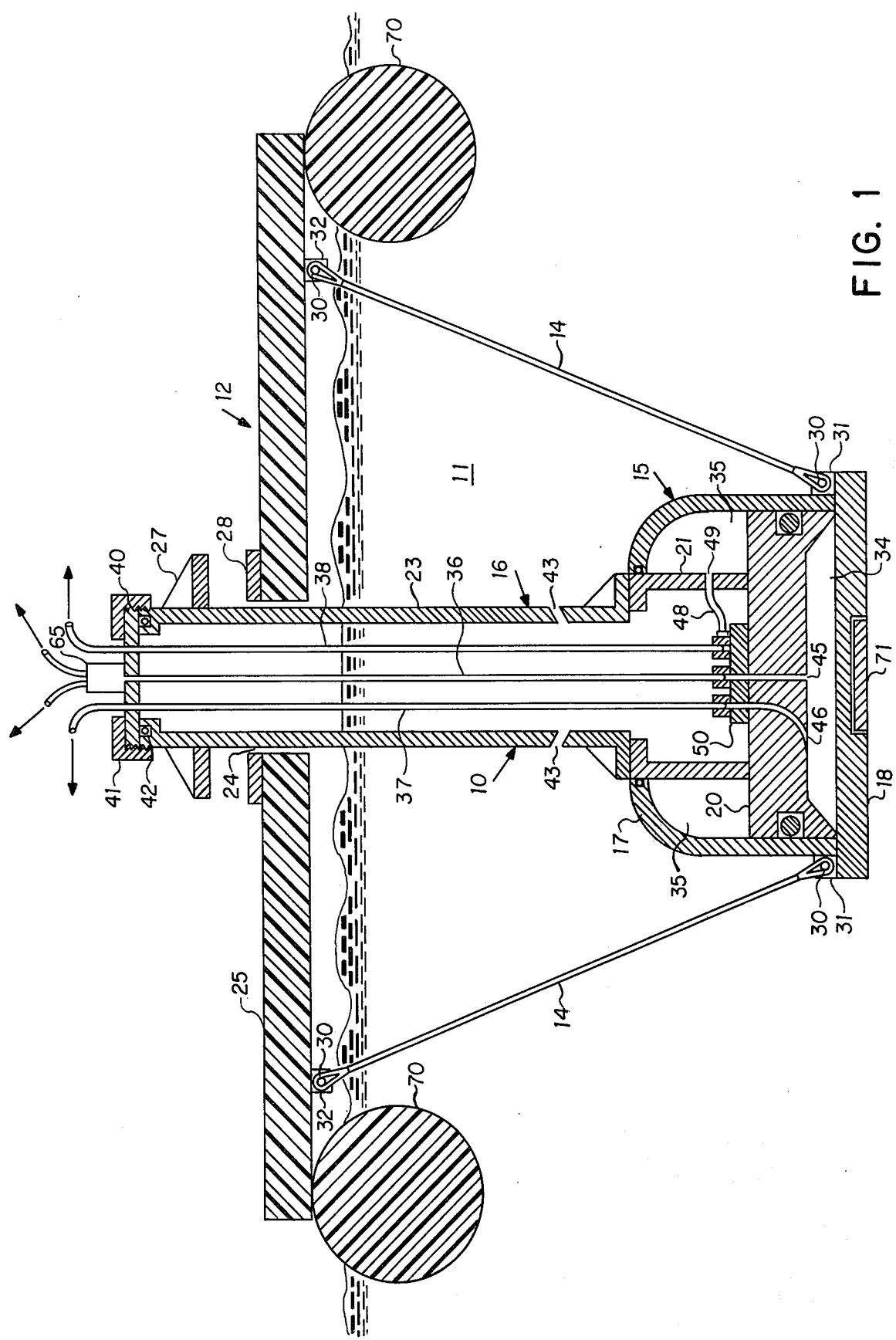
FIG. 1 is a view of the apparatus of a preferred embodiment of this invention taken in vertical section.

A seismic generator 10 is supported beneath the surface of the body of water 11 from a floating platform 12 by means of a plurality of ropes 14. The seismic generator 10 consists basically of a rigid lower member 15 and a rigid upper member 16 telescoping therein to permit limited relative vertical movement therebetween. Lower member 15 consists of an upstanding cylindrical housing 17 and a bottom impact pan 18. The upper member 16 includes the solid piston 20 sealably fitted with the housing 17 for relative movement, the upstanding barrel 21 fixed to the upper surface of the piston 20 and the hollow pedestal 23 fixed to and extending from the top of the barrel 21 through an aperture 24 in the deck 25 of floating platform 12 to a point above the surface of the water. Thus, piston 20, barrel 21 and pedestal 23 move together as a single unit.

The ropes 14 are seen to be interconnected between the under surface of the deck 25 and the periphery of the impact pan 18. The ropes 14 are constructed to support the lower member 15 at a distance below the deck 25 such that when the upper member 16 is fully telescoped therein an air space or clearance is provided between the pedestal flange 27 and the carrying plate 28. This insures that the entire weight of the seismic generator 10, except for the buoyancy of the water itself, is supported by means of the ropes 14 and the upper member 16 is neither supported nor restrained in its movement in either direction by an interconnection with the floating platform 12. The width of aperture 24 is sufficient to insure that no frictional contact occurs between pedestal 23 and the deck 25.

Figure 2:
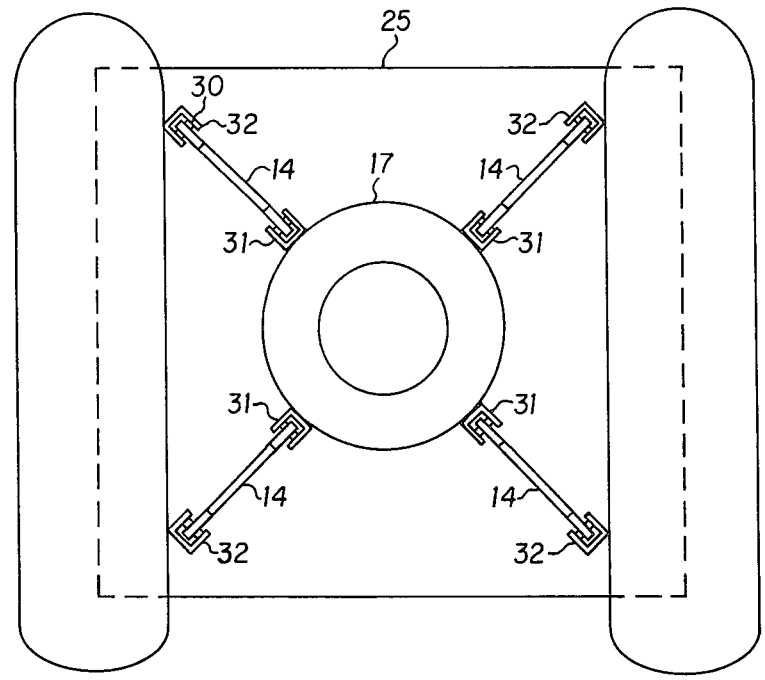
FIG. 2 is a diagrammatic plan view of the apparatus of a preferred embodiment of this invention showing a plurality of supporting ropes.

With reference to FIG. 2, it may be observed that preferably the support ropes 14 are four in number and preferably spaced symmetrically about the periphery of the pan 18. However, there is no intention to limit the manner of support to four such ropes 14 so long as adequate stability is achieved in operation. It is also emphasized, as will become apparent from the description, that within the scope of this invention the point of interconnection between the ropes 14 and the lower member 15 need not be precisely at the impact pan 18 but, for example, might be to some intermediate point on the surface of the cylindrical housing 17.

Preferably each rope 14 is formed by double looping a circular cross section braided strand of low resilience polypropylene of about ⅝ inch diameter, passing the loops at either end around two spools 30 supported respectively by one of the lower brackets 31 secured to the lower member 15 and one of the upper brackets 32 secured to the underside of the deck 25. To insure that these rope strands do not become separated and twisted in operation, they may be taped together along substantially their entire length so that the four thicknesses of rope strand lie generally in one plane.

With continued reference to FIG. 1, it is seen that an expansible combustion chamber 34 is formed between the piston 20 and the impact pan 18. The space above the piston 20 external to the cylindrical shell 21 is filled with compressed air to form an air box 35 which biases the piston 20 downwardly and correspondingly damps the upward movement thereof relative to the housing 17. A suitable oxygen and combustible fuel mixture is introduced into the lower member 15 by means of the conduit 36 while the conduit 37 allows escape of exhaust gases from the chamber 34. The conduit 38 allows the introduction of compressed air into the air box 35. The upper ends of the conduits 36, 37 and 38 are fixed to the detachable mounting plate 40 which rests on the top of the pedestal 23 and which is secured in position by the retainer ring 41 which is threadably secured to the outer periphery of the pedestal 23. An O-ring seal 42 cushions the joint between the mounting plate 40 and the pedestal tube 23. The bottom ends of the conduits 36 and 37 are adapted to register or align respectively with holes 45 and 46 extending through the body of the piston 20 so as to communicate with the chamber 34. In like manner, the lower end of the conduit 38 communicates with one end of the conduit 48, the other end of which extends through an aperture 49 in the cylindrical shell 21 to provide entry into the air box 35. The wall of the pedestal 23 is perforated by a plurality of ports 43 to enable water to fill therein when the generator 10 is submerged.

Figure 3:
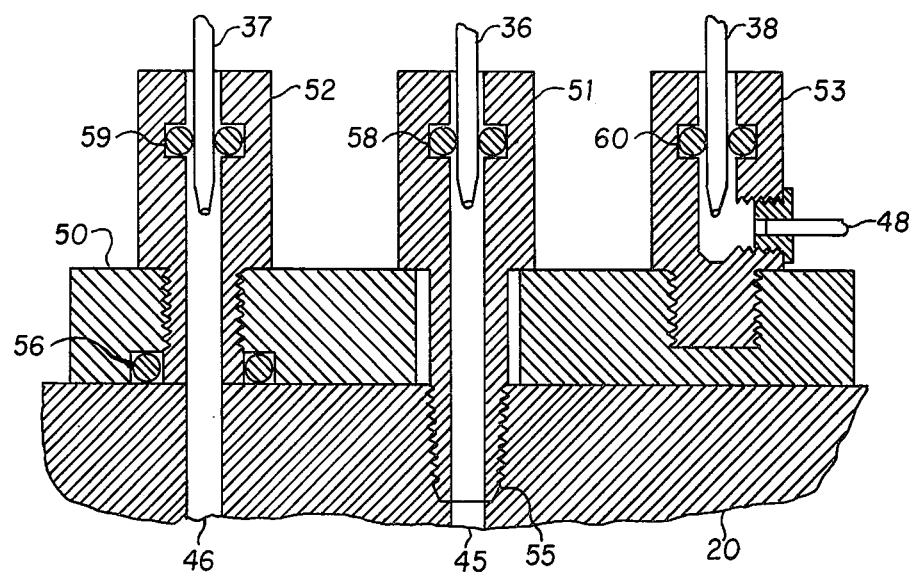
FIG. 3 is a detailed view in vertical cross section illustrating the manner of interconnection between the conduits and the piston.

With reference now to FIG. 3, an adapter plate 50 welded or bolted in suitable fashion to the upper surface of the piston 20 provides a base for mounting the cylindrical sleeves 51, 52 and 53 which are provided with vertical bores adapted to slidably receive the respective lower ends of the conduits 36, 37 and 38. The manner of assembling each of these sleeves 51, 52 and 53 is such as to insure positive alignment and to prevent leakage of water into the chamber 34 and air box 35. The sleeve 51 is preferably constructed of a material such as brass having a different coefficient of heat expansion from that of the adapter plate 50 and is provided with a threaded and tapered base 55 passing with clearance through the adapter plate 50 and screwed into the piston 20 in alignment with the piston hole 45 which carries ignited fuel. The sleeve 52 is threadably joined to the adapter plate 50 so that it is aligned with the exhaust hole 46, and provided with an O-ring seal 56 compressed between the adapter plate 50 and the upper surface of the piston 20. Finally, the side wall of the sleeve 53 also threaded into piston 20 is perforated to receive one end of the conduit 48 and establish communication with the blind lower end of the bore of the sleeve 53 below the lower end of the conduit 38. The lower ends of the conduits 36, 37 and 38 are adapted to be situated respectively below the seals 58, 59 and 60 and are inwardly tapered.

When the apparatus of this invention is to be assembled, the conduits 36, 37 and 38, together with their mounting plate 40, will readily align with the respective vertical bores of sleeves 51, 52 and 53 so that the tapered ends of the conduits are easily inserted therein.

Leakage of water into the combustion chamber 34 is prevented by tight fitting O-ring seals 58, 59 and 60, which however are water lubricated so that the lower ends of the conduits may readily slide in the bores in either direction.

In operation, after air box 35 is filled to a desired pressure, fuel and oxygen from suitable sources, which may be, for example, mounted on the deck 25, are introduced into combustion chamber 34. Ignition of the fuel mixture is accomplished by means well-known to those skilled in the art unnecessary to detail here. The resultant explosion in chamber 34 lifts the upper member 16 rapidly and compresses the air box 35. The energy of the explosion is simultaneously exerted against the lower member 15 in a downwardly direction. However, the ropes 14 are selected to have a low range elasticity so as to greatly impede downward movement of the pan 18. At the same time, it is desirable that the downward energy is substantially absorbed within this elastic limit. The optimum compromise between these characteristics will depend on various factors such as the weight and configuration of the generator 10, the force of the explosion, and the desired singularity of the resultant implosion pressure pulse.

As the limit of compression of the air box 35 is approached, the piston 20 transmits a sudden lifting force to the housing 17, which is accentuated by the subsequent expansion of the air box 35. A rapid net upward water displacement occurs at the under surface of the impact pan 18. The implosion of the vapor bubble so formed generates the desired acoustic pressure pulse within the water.

The low resilience construction of the ropes 14 serves to provide shock isolation for the platform 12. Also in recoiling from their stretched condition, the ropes 14 will release stored energy to increase the upward force on the lower member 15. Some energy is transmitted to the water by reason of the submergence of the floats 70 at the moment of explosion, the reaction to which gives further impetus to the upward thrust on the pan 18. Since the speed of movement of the pan 18 directly affects the size of the vapor bubble formed and the amplitude of the resultant pressure pulse, it is desirable to maximize this velocity. With this in mind, the upper surface of the cylindrical housing 17 may be smoothly curved and joined to the pedestal 23 in such a fashion as to minimize hydrodynamic resistance to its upward travel. This will also help to decrease possible cavitation effects adjacent such upper housing surface which might otherwise interfere with the singularity of the principal implosion pulse.

It should be understood that the elimination of extensive downward movement of the pan 18 in the manner described prevents the occurrence of a large acoustic precursor pulse. Experiments have shown that by so limiting this downward movement and by concurrently increasing the velocity of the upward movement of the pan 18, the peak amplitude of the implosion pulse may be made to exceed that of the precursor by a factor of ten to one.

The significance of the particular construction of the conduits 36, 37 and 38 in their relation to the sleeves 51, 52 and 53 may now be explained. It has been found that if both upper and lower ends of these conduits are in fixed relation to the upper member 16 that the force of a gas explosion in chamber 34 may cause rupture to their walls at some intermediate point along their lengths. This is believed to result from the fact that momentary axial compression of these conduits occurs. By allowing the lower ends of conduits 36, 37 and 38 to slide freely within the vertical bores of the sleeves 51, 52 and 53, as in the present apparatus, these conduits are pulled upwardly from their upper ends by means of the mounting plate 40. They are, therefore, in momentary axial tension, which can be much more easily tolerated by a thin-walled tube without failure.

Since erosion or pitting of a submerged surface adjacent a cavitation bubble is undesirable, a central portion of the under surface of the pan 18 may consist of a plug or insert 71, preferably selected of a tool steel of very high strength. The implosion front in a vapor bubble is found to collapse toward the center of the adjacent surface, and thus protection at this point is of particular value.

Viewed as a method, the invention set forth in this application is exemplified by the steps of supporting, submerged in a fluid, a hollow cylindrical body having a plane external surface at one end thereof and preferably shaped at the other end to minimize resistance to axial motion through the fluid, providing an axially expansible chamber within the body, elastically restraining axial movement of the body through the fluid in a direction in which said one end is forward while permitting relatively free movement of said body in an opposite direction, confining a gas explosion in the chamber, and positioning spring means in the body compressible in response to the expansion of the chamber. As the limit of expansion of the chamber is approached and reached, the energy of the explosion is transmitted suddenly through the successive compression and expansion of the spring to the body so as to drive it rapidly in the opposite direction. Displacement of the water adjacent the plane surface generates a vapor bubble and an implosion type acoustic pressure wave results.

It should also be pointed out that although the invention has been described and illustrated with a certain degree of particularity, it is understood that the present disclosure has been made only by way of example and that numerous changes in the details of construction and the combination and arrangement of parts may be resorted to without departing from the spirit and scope of the invention as hereinafter claimed.

The embodiments of the invention in which an exclusive property or privilege is claimed are defined as follows.

1. A device for generating acoustic waves by implosion of a vapor bubble in water comprising:
   a. means defining an expansible sealed combustion chamber between a rigid lower member and a rigid upper member telescoping therein so as to permit limited relative vertical movement therebetween;
   b. means for supporting said lower member beneath the surface of the water so as to apply a predetermined restraint to downward movement thereof; and
   c. means for confining an explosion within said chamber to lift said upper member and to thereby transmit a further lifting force to said lower member, whereby said vapor bubble is created beneath and adjacent said lower member.

2. A device for generating an acoustic wave by implosion of a vapor bubble in water comprising:
   a. means defining a sealed cylindrical combustion chamber axially expansible to a limited extent;

b. means for supporting said chamber defining means beneath the surface of the water so as to restrain movement thereof in one axial direction; and c. means for explosively expanding said chamber to said limited extent in an opposite axial direction thereby exerting a force to displace said chamber defining means in said opposite axial direction, whereby a vapor bubble is created behind said chamber defining means.

3. A system for generating an acoustic pulse by implosion of a vapor bubble in water comprising:

a. a support platform carried upon the surface of the water;

b. a closed, upstanding cylindrical housing dependently supported from said platform beneath the surface of the water;

c. a piston slidably mounted in said housing without external support and adapted to form with the bottom and side walls of said housing an axially expansible combustion chamber;

d. means for normally biasing said piston toward said housing bottom; and e. means for confining a gas explosion within said chamber so as to lift said piston a predetermined distance within said housing in opposition to said biasing means, said piston being thereafter adapted to transmit a lifting force to said housing so as to form said vapor bubble therebeneath.

4. A system as in claim 3 wherein said housing is elastically supported from said platform by nonrigid means interconnected between said platform and said housing.

5. A system as in claim 4 wherein said nonrigid means are connected to the bottom of said housing.

6. A system as in claim 4 wherein said nonrigid support means comprise a plurality of ropes of predetermined low elasticity.

7. A system as in claim 6 wherein said ropes are four in number.

8. A system as in claim 6 wherein each of said ropes consists of multiple strands of braided polypropylene fiber.

9. A system as in claim 6 wherein upon said gas explosion within said chamber said ropes are stretched within their elastic limit.

10. A system as in claim 3 further comprising:

a. a hollow tube having its lower end connected to said piston and extending therefrom above the water surface;

b. a plurality of conduits extending through said tube adapted to carry fuel, air, and exhaust products, respectively, said conduits being supported from said tube at their upper ends; and c. means for maintaining the lower ends of said conduits in operative communication respectively with a like number of holes through said piston to introduce said fuel and air into said housing and to scavenge said exhaust products therefrom.

11. A system as in claim 10 wherein said communication means comprises a plurality of receptacles mounted on the upper surface of said piston, said receptacles being provided respectively with vertically extending cylindrical bores adapted to receive the respective lower ends of said conduits in slidable relation thereto, said bores being aligned respectively with said holes in said piston.

12. Apparatus as in claim 11 additionally including sealing means within each of said bores adapted to resiliently contact said conduits.

13. Apparatus as in claim 12 wherein the lower ends of said conduits are inwardly tapered.

14. Apparatus as in claim 3 wherein the upper surface of said cylindrical housing is hydrodynamically streamlined to minimize resistance to upward axial movement thereof.

15. A method of creating an acoustic pulse by implosion of a vapor bubble in the water comprising the steps of:

a. supporting a closed, cylindrical housing beneath the surface of the water so as to substantially restrain the movement of said housing in one axial direction while permitting relatively free movement thereof in an opposite axial direction; and b. confining an explosion within a sealed chamber in said housing expansible axially thereof in said opposite axial direction so that when the limit of said expansion is approached the energy of said explosion displaces said housing in the water to create said vapor bubble therebeneath.

16. A method as in claim 15 wherein the downward movement of said housing is elastically restrained.

17. A method as in claim 15 wherein the peak amplitude of the pulse resulting from said implosion exceeds the peak amplitude of the compressional pulse resulting from the movement of said housing in said one direction by a factor of at least ten to one.

18. A method as in claim 15 wherein said housing is in an upstanding position so that said one axial direction is downward and said opposite axial direction is upward.

* * * * *